United States Patent
Fujita et al.

(10) Patent No.: US 10,132,283 B2
(45) Date of Patent: Nov. 20, 2018

(54) ENGINE STARTING APPARATUS

(71) Applicant: DENSO CORPORATION, Kariya, Aichi-pref. (JP)

(72) Inventors: Tatsuya Fujita, Obu (JP); Mitsuhiro Murata, Niwa-hun (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/675,848

(22) Filed: Apr. 1, 2015

(65) Prior Publication Data

US 2015/0275837 A1 Oct. 1, 2015

(30) Foreign Application Priority Data

Apr. 1, 2014 (JP) ................. 2014-075438

(51) Int. Cl.
| | | |
|---|---|---|
| *F02N 11/08* | (2006.01) | |
| *F02P 9/00* | (2006.01) | |
| *F02D 41/06* | (2006.01) | |
| *F02P 5/15* | (2006.01) | |
| *F02N 15/04* | (2006.01) | |
| *F02N 15/06* | (2006.01) | |
| *F02P 5/04* | (2006.01) | |

(52) U.S. Cl.
CPC .......... *F02N 11/08* (2013.01); *F02D 41/062* (2013.01); *F02P 5/1506* (2013.01); *F02P 9/00* (2013.01); *F02D 2200/04* (2013.01); *F02D 2200/1012* (2013.01); *F02N 11/0848* (2013.01); *F02N 11/0855* (2013.01); *F02N 15/04* (2013.01); *F02N 15/067* (2013.01); *F02N 2200/022* (2013.01); *F02N 2200/102* (2013.01); *F02P 5/045* (2013.01); *Y02T 10/46* (2013.01)

(58) Field of Classification Search
CPC ............. F02D 41/1454; F02D 41/1487; F02D 41/1444
See application file for complete search history.

(56) References Cited

U.S. PATENT DOCUMENTS

| | | | |
|---|---|---|---|
| 2002/0047354 A1* | 4/2002 | Iwamoto | F02N 11/10 310/68 C |
| 2004/0084907 A1* | 5/2004 | Kuribayashi | F02D 41/062 290/40 A |
| 2008/0022958 A1* | 1/2008 | I | F02D 41/0002 123/179.3 |

FOREIGN PATENT DOCUMENTS

| | | |
|---|---|---|
| JP | 2002195069 A | 7/2002 |
| JP | 4973595 B2 | 7/2012 |

* cited by examiner

*Primary Examiner* — Kevin A Lathers
(74) *Attorney, Agent, or Firm* — Oliff PLC

(57) ABSTRACT

An engine starting apparatus including a starter including a motor configured to generate a rotational force, and a pinion configured to transfer the rotational force of the motor to a ring gear. The starter is configured to crank an engine at a specific revolution-speed increase rate to increase a revolution speed of the engine to a predetermined revolution speed equal to or greater than 450 rpm. The apparatus further includes an ignition-timing setter configured to set an ignition timing at which fuel in a combustion chamber of the engine is ignited while the revolution speed of the engine is increased during cranking of the engine by the starter or during coasting of the engine after termination of cranking of the engine by the starter, and an engine-speed predictor configured to predict a revolution speed of the engine at the ignition timing based on the specific revolution-speed increase rate.

7 Claims, 4 Drawing Sheets

ENGINE STARTING APPARATUS

CROSS-REFERENCE TO RELATED APPLICATION

This application is based on and claims the benefit of priority from earlier Japanese Patent Applications No. 2014-75438 filed Apr. 1, 2014, the descriptions of which are incorporated herein by reference.

BACKGROUND

Technical Field

The present invention relates to an engine starting apparatus.

Related Art

A conventional technique for starting an engine uses an inertia-engagement-type starter to crank the engine until a predetermined revolution speed of the engine NO within a low engine-speed range (5400 rpm) is reached, and after the revolution speed of the engine NO is reached, increases the revolution speed of the engine to an idle speed with combustion in a combustion chamber. Usually, as shown in FIG. 4, increasing the revolution speed of the engine to the idle speed requires multiple fuel injections and ignitions (multiple fuel injections in the case of the diesel engine). For example, first fuel injection and ignition, second fuel injection and ignition, third fuel injection and ignition, and fourth fuel injection and ignition are sequentially performed in a first cylinder, a third cylinder, a fourth cylinder, and a second cylinder, respectively.

As for the combustion in the combustion chamber, an ideal fuel injection quantity in terms of the exhaust emission and fuel economy decreases with increasing revolution speed of the engine. A fuel injection quantity in excess of the ideal fuel injection quantity will cause rich combustion or in-cylinder injection of excess fuel, which leads to poor fuel economy and deteriorated exhaust emission. Therefore, it is desired to predict a revolution speed of the engine at ignition, more specifically, at firing in the case of the gasoline engine or at fuel injection in the case of the diesel engine, and set a fuel injection quantity corresponding to the predicted revolution speed of the engine.

For the gasoline engine, the fuel injection quantity is set, which is followed by injecting the set quantity of fuel and firing the injected fuel. Therefore, it is desired to predict a revolution speed of the engine at firing and set a fuel injection quantity corresponding to the predicted revolution speed of the engine.

The above conventional technique, however, necessitates multiple ignitions until the idle speed is reached. In addition, as described below, it is very difficult to predict the revolution speed of the engine at each ignition timing.

When a first combustion does not take place at the first ignition, the starter continues to crank the engine through application of a torque to the engine. Therefore, the second ignition takes place during cranking of the engine, that is, while the revolution speed of the engine is in a low revolution speed range.

When a first combustion takes place at the first ignition, the cranking of the engine terminates under action of a one-way clutch of the starter, and the revolution speed of the engine increases with the combustion. The second ignition takes place during increasing of the revolution speed of the engine through the combustion, which leads to a reduced fuel injection quantity as compared with when the first combustion does not take place at the first ignition.

The fuel injection quantity at the second ignition is set prior to the second ignition timing. However, at the time when the fuel injection quantity at the second ignition is set, it is not known whether the first combustion has taken place at the first ignition. Therefore, it becomes difficult to accurately predict the revolution speed of the engine at the second ignition.

Conventionally, as a failsafe, the fuel injection quantity at the second ignition is set to a slightly larger fuel injection quantity without predicting the revolution speed of the engine at the second ignition so that the larger fuel injection quantity can cause the second combustion even in the absence of the first combustion at the first ignition. Such a conventional technique suffers from poor fuel economy and deteriorated exhaust emission when the first combustion takes place at the first ignition.

In addition, predicting the revolution speed of the engine at ignition after termination of the cranking of the engine necessitates predicting a rate of increase in revolution speed of the engine resulting from the combustion, which makes it difficult to predict the revolution speed of the engine at ignition after termination of the cranking of the engine. That is, it is difficult to predict the revolution speed of the engine during a time period from when the predetermined revolution speed of the engine NO (in the low revolution speed range) is reached at which the cranking of the engine is terminated to when the idle speed is reached. Since the revolution speed of the engine at ignition is thus likely to be underestimated, the fuel injection quantity will be inevitably overestimated, which causes revolution speed of the engine overshoot above the idle speed, as shown in FIG. 4.

That is, with the conventional technique for starting the engine, it is very difficult to predict the revolution speed of the engine at ignition during increasing of the revolution speed of the engine, which inevitably leads to control such that the revolution speed of the engine at ignition is underestimated and the fuel injection quantity is therefore overestimated. This may lead to the revolution speed overshoot in excess of the idle speed, poor fuel economy, and deteriorated exhaust emission.

Japanese Patent No. 4973595 discloses a technique for correcting an initial fuel injection quantity. This technique, however, does not disclose accurately predicting the revolution speed of the engine at ignition to set a fuel injection quantity corresponding to the predicted revolution speed of the engine. In addition, Japanese Patent No. 4973595 does not disclose setting a fuel injection quantity corresponding to the revolution speed of the engine at ignition while the revolution speed of the engine is increased.

In consideration of the foregoing, exemplary embodiments of the present invention are directed to providing an engine starting apparatus capable of accurately predicting a revolution speed of an engine at ignition and injecting an appropriate quantity of fuel to increase the revolution speed of the engine to an idle speed.

SUMMARY

In accordance with an exemplary embodiment of the present invention, there is provided an engine starting apparatus including a starter including a motor configured to generate a rotational force, and a pinion configured to transfer the rotational force of the motor to a ring gear. The starter is configured to crank an engine at a specific revolution-speed increase rate to increase a revolution speed of the engine to a predetermined revolution speed equal to or greater than 450 rpm. The apparatus further includes an ignition-timing setter configured to set an ignition timing at which fuel in a combustion chamber of the engine is ignited while the revolution speed of the engine is increased during cranking of the engine by the starter or during coasting of the engine after termination of cranking of the engine by the starter, and an engine-speed predictor configured to predict a revolution speed of the engine at the ignition timing based on the specific revolution-speed increase rate.

This allows the engine to be cranked until the revolution speed of the engine reaches a high engine-speed range, the lower limit of which range is equal to or greater than 450 rpm near the idle speed. Thus, in most cases, the ignition does not need to be repeated to start the engine. This is because the engine continues to be cranked until the idle speed is reached or until about shortly before the idle speed is reached. In contrast, with the conventional techniques, the idle speed is reached by combustion through successive ignitions.

In addition, the fuel in the combustion chamber is ignited while the revolution speed of the engine is increased during cranking of the engine by the starter or during coasting of the engine after the termination of cranking of the engine by the starter, which allows the revolution speed at the ignition timing to be accurately predicted from the revolution-speed increase rate during cranking of the engine. Thus, the engine starting apparatus of the embodiment is capable of injecting an appropriate quantity of fuel to increase the revolution speed of the engine to the idle speed.

DESCRIPTION OF SPECIFIC EMBODIMENTS

Figure 1A:
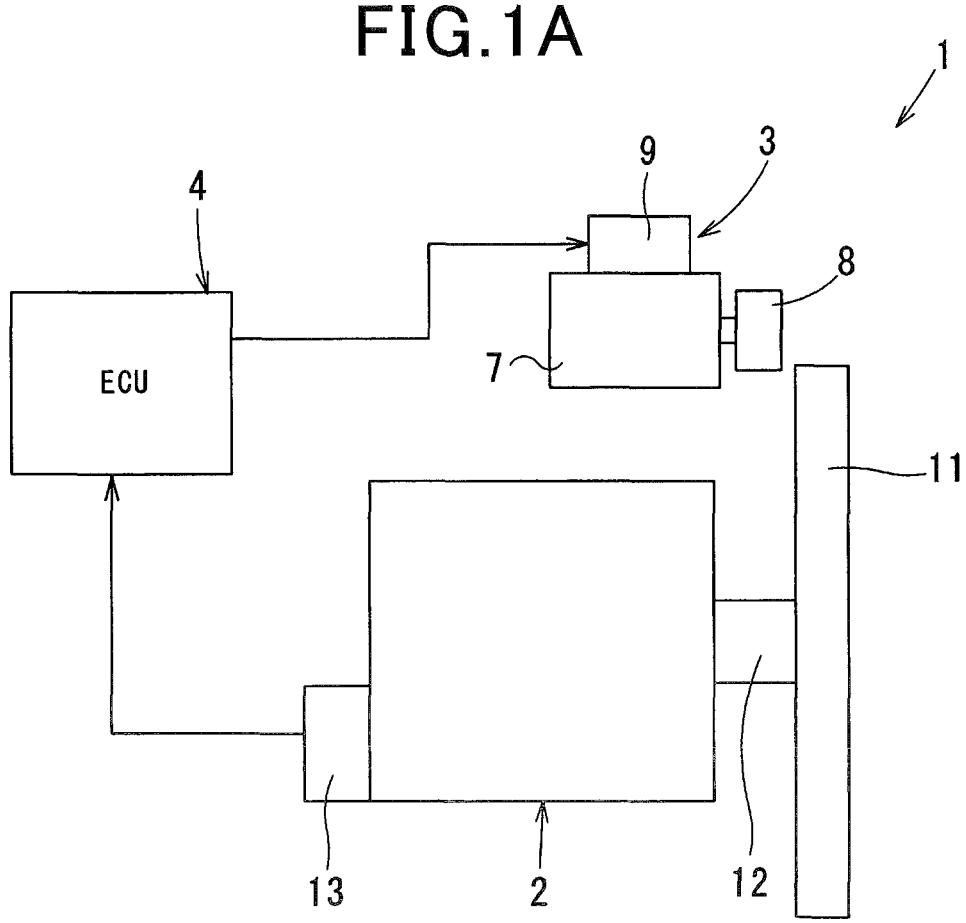
FIG. 1A is a block diagram of an engine starting apparatus in accordance with one embodiment of the present invention.

Referring now to the accompanying drawings wherein like reference numerals refer to similar or identical parts throughout the several views, and more specifically to FIGS. 1A, 1B, 2, and 3 thereof, there is shown an apparatus 1 for starting an engine 2. The engine 2 may be a multiple cylinder engine. The apparatus 1 is hereinafter also referred to as an engine starting apparatus.

As shown in FIG. 1A, the engine starting apparatus 1, applied to a vehicle equipped with an idle-stop system for automatically controlling stopping and restarting of the engine 2, includes a starter 3 for starting the engine 2, and an electronic control unit (ECU) 4 for controlling the operations of the starter 3 and an igniter (not shown).

The engine 2 of the present embodiment is a spark-ignited gasoline engine.

The starter 3 is an inertia-engagement-type starter capable of rotating up to speeds above an idle speed of the engine 2 and includes a motor 7, a pinion 8, an electromagnetic switch 9 and others.

The motor 7 is a direct-current (DC) commutator motor that includes a field (not shown) formed of permanent magnets (or field coils) disposed on an inner circumference of a yoke also serving as a frame, an armature having a commutator (not shown) disposed on an outer circumference of an armature axis, and brushes (not shown) disposed on an outer circumference of the commutator.

The motor 7 is capable of rotating up to speeds above the idle speed.

The pinion 8, which is a small gear disposed on an output shaft of the motor 7, meshes with a ring gear 11 to transfer the rotational force of the motor 7 to a crankshaft 12 of the engine 2 connected to the ring gear 11.

The electromagnetic switch 9 not only serves as pinion pushing means for pushing the pinion 8 toward the ring gear 11 via a shift lever (not shown) so that the pinion 8 is engaged with the ring gear 11, but also as a motor switch within an energization circuit for powering on and off the motor 7. In the electromagnetic switch 9, a solenoid for pushing the pinion 8 toward the ring gear 11 and a solenoid for turning on and off energization current of the motor 7 may be the same or distinct from each other.

The electronic control unit (ECU) 4 serves as starter control means for controlling energization of the starter 3 based on signals from an engine speed sensor 13 for detecting a revolution speed of the engine (also referred to as an engine speed), a start switch (not shown), a brake sensor (not shown) and the like.

The engine starting apparatus 1 is configured to operate the motor 7 with the pinion 8 engaged with the ring gear 11 to thereby crank the engine 2, and de-engage the pinion 8 from the ring gear 11 or de-energize the motor 7 to thereby terminate the cranking of the engine 2.

That is, upon command to start the engine 2, the ECU 4 puts the starter 3 in a drive ON state to crank the engine 2.

The drive ON state refers to a state such that the pinion 8 is in engagement with the ring gear 11 after being pushed toward the ring gear 11 and the motor 7 is in an energized state, and the rotational force of the motor 7 is thereby transferred to the crankshaft 12.

The command to start the engine 2 may be signaled to the ECU (starter control unit) 4 as a signal from the start switch that the start switch has been turned on while the engine 2 is stopped. In a vehicle equipped with the idle-stop system, the engine is restarted when idle stop (or idle shut down) is exited by deactivating the brake. Therefore, the command to start the engine 2 may also be signaled to the ECU (starter control unit) 4 as a detection signal from the brake sensor that the brake has been operated off. The ECU 4 is also commanded to restart the engine 2 when the brake is operated off during slowing to an automatic stop of the engine 2.

When a predetermined condition for terminating cranking of the engine is met, the ECU 4 returns the pinion 8 from the engaged position back into the original position to de-engage the pinion 8 from the ring gear 11 or de-energizes the motor 7 to thereby terminate cracking of the engine 2. That is, the ECU 4 puts the starter 3 in a drive OFF state.

Features

In the present embodiment, the starter 3 cranks the engine 2 at a specific revolution-speed increase rate (or an acceleration of revolution) until a predetermined revolution speed N1 equal to or greater than 450 rpm is reached.

The cranking of the engine is terminated at the predetermined revolution speed N1 before the idle speed is reached.

The specific revolution-speed increase rate is set such that, during coasting of the engine 2 after termination of cranking of the engine 2, the revolution speed of the engine can continue to increase from the predetermined revolution speed N1 (equal to or greater than 450 rpm, and less than the idle speed) for a predefined amount of time.

As an example, the revolution speed of the engine is substantially linearly increased to 600 rpm (as the predetermined revolution speed N1) in 0.3 seconds by the starter 3 cranking the engine 2. That is, the specific revolution-speed increase rate is 2000 rpm/s. In this example, during coasting of the engine 2 after the termination of cranking of the engine 2, the revolution speed of the engine can continue to substantially linearly increase from the predetermined revolution speed N1 for a certain time.

The above specific revolution-speed increase rate is also set such that, during cranking of the engine 2, the rotational force of the starter 3 can continue to be transferred from the pinion 8 to the ring gear 11 even when the revolution speed of the engine is increased abruptly with pumping of the engine 2 during cranking of the engine 2.

Figure 4:
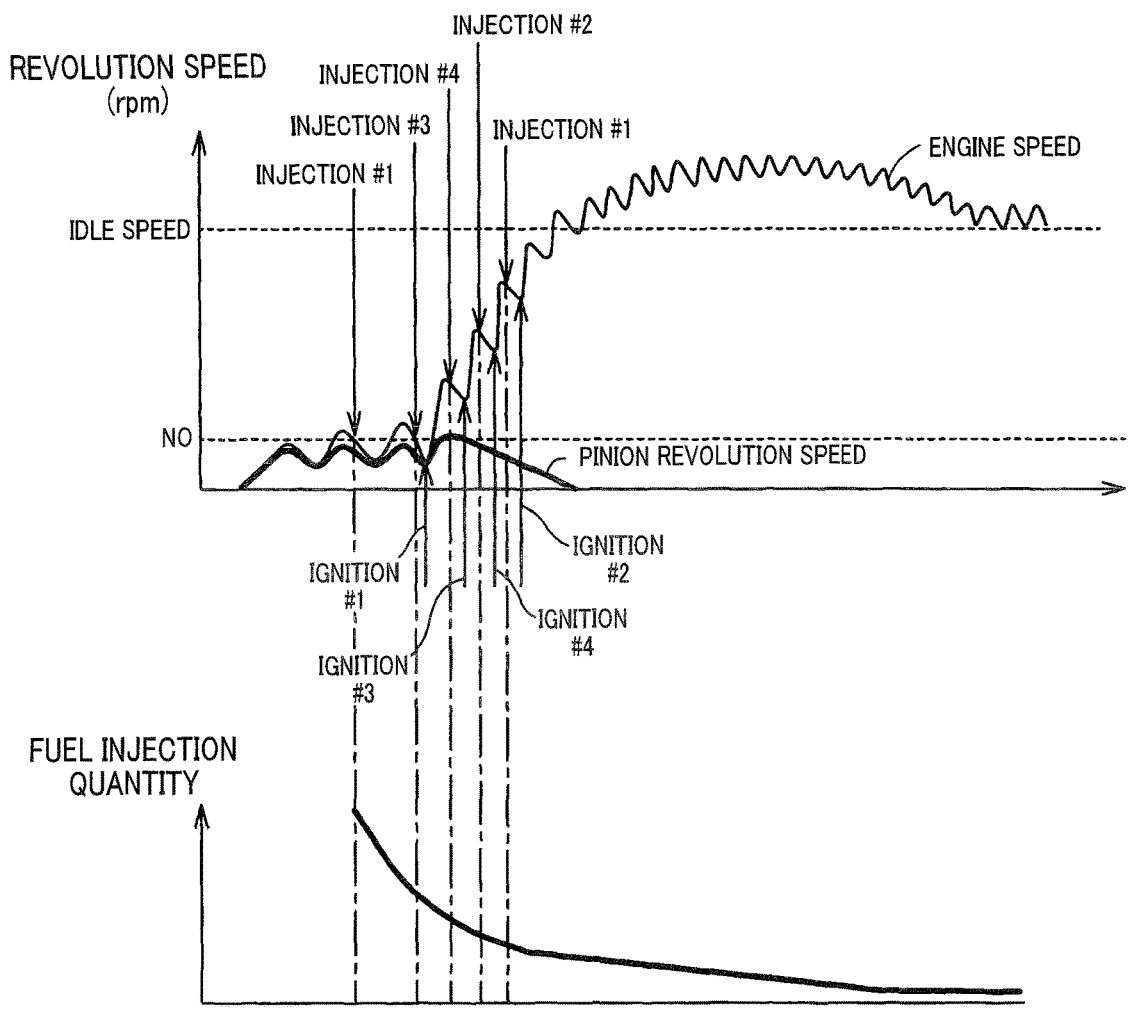
FIG. 4 is a timing diagram of a revolution speed of the engine, a pinion revolution speed, and a fuel injection quantity in accordance with the prior art.

In the case of a low revolution-speed increase rate, as shown in FIG. 4, the pinion 8 may be de-engaged from the ring gear 11 in an early stage of cranking of the engine 2 (for example, about until pistons of three cylinders sequentially move through their respective top dead centers (TDCs) as described later) when the revolution speed of the engine is increased abruptly with pumping of the engine 2, which disables transferring of the torque of the starter 3 from the pinion 8 to the ring gear 11. Such a phenomenon is referred to as "torque loss". Upon occurrence of such torque loss, as shown in FIG. 4, the revolution speed of the engine may exceed the revolution speed of the pinion 8 even during cranking of the engine 2.

In the present embodiment, however, based on prior knowledge of the revolution-speed increase rate of the engine 2 with pumping of the engine 2 that is acquired beforehand, the engine 2 may be cranked at a revolution-speed increase rate higher than the known increase rate of the revolution speed of the engine 2.

Figure 2:
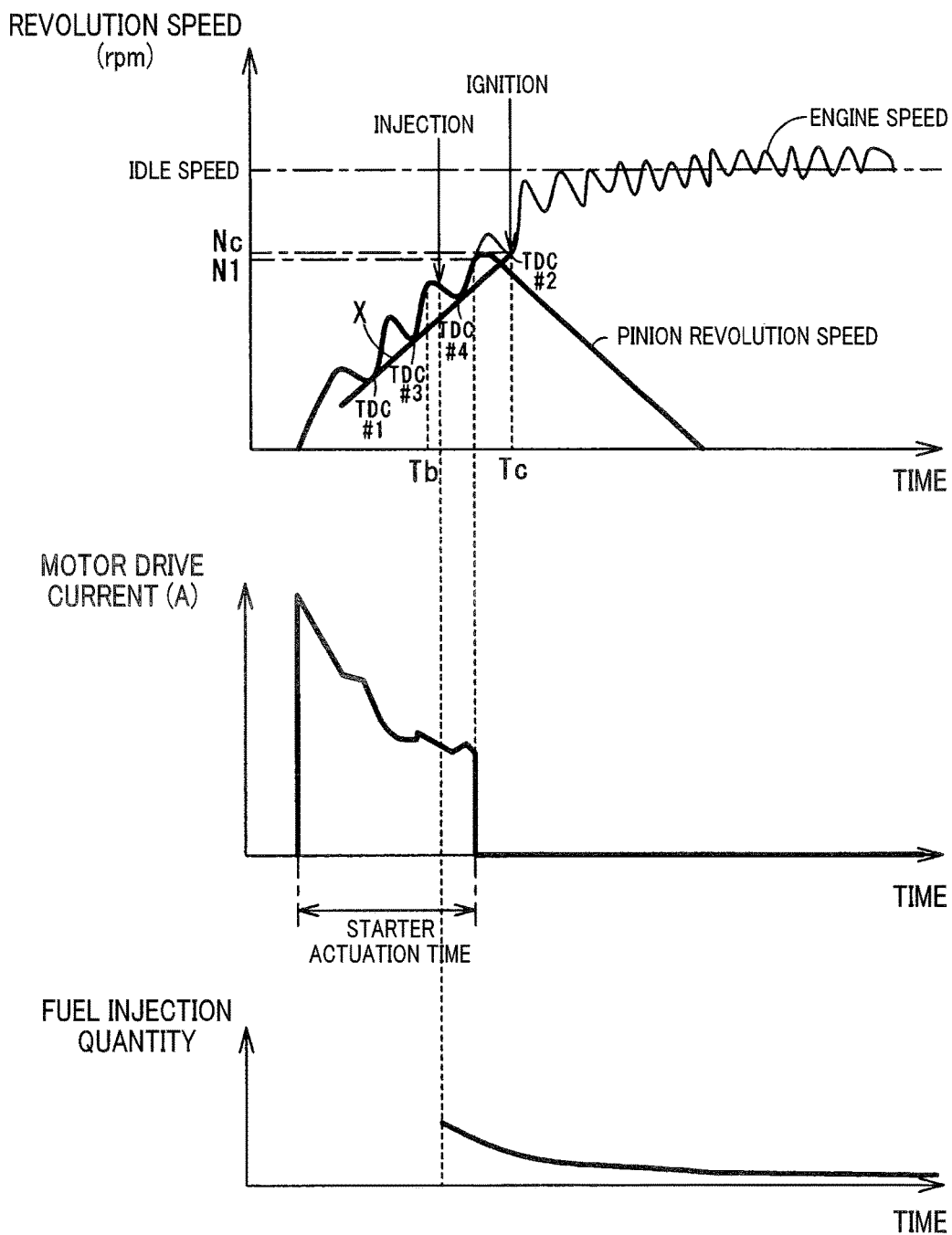
FIG. 2 is a timing diagram of a revolution speed of the engine, a pinion rotation, a motor drive current, and a fuel injection quantity.

With the engine starting apparatus 1, pistons of multiple cylinders move through their respective TDCs during cranking of the engine 2. For example, in the present embodiment, as shown in FIG. 2, the pistons of the first, third, fourth, and second cylinders move through their respective TDCs in this order. During cranking of the engine 2, the pistons of the first, third, and fourth cylinders move through their respective TDCs.

The revolution speed increases linearly as the pistons of the first, third, and fourth cylinders move through their respective TDCs in this order. That is, as shown in FIG. 2, the revolution speeds at TDCs of the first, third, and fourth cylinders lie on an approximate line or a fitted line X that is a straight, monotonically increasing line. The slope of the approximate line X provides a revolution-speed increase rate in the present embodiment. For example, as described above, the revolution-speed increase rate (i.e., the slope of the approximate line X) is 2000 rpm/s.

Figure 1B:
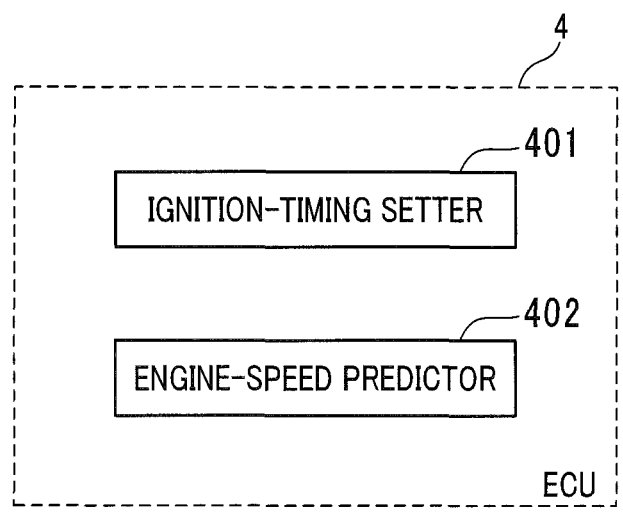
FIG. 1B is a functional block diagram of an electronic control unit (ECU) of the engine starting apparatus shown in FIG. 1A.

As described later, the ECU 4 includes an ignition-timing setter 401 and an engine-speed predictor 402 (see FIG. 1B).

The ignition-timing setter 401 is configured to set an ignition timing at which the fuel in the combustion chamber is ignited while the revolution speed of the engine is increased during cranking of the engine 2 by the starter 3 or during coasting of the engine 2 after termination of cranking of the engine 2 by the starter 3.

In the present embodiment where the engine 2 is a gasoline engine, the ignition timing is a firing timing at which the fuel in the combustion chamber is fired or sparked by the igniter, such as a spark plug.

In some other embodiments where the engine 2 is a diesel engine, the fuel in the combustion chamber is ignited at the same time as the fuel is injected into the combustion chamber. That is, the ignition timing is the same timing as the fuel injection timing.

In the present embodiment, for example, the first ignition timing Tc after the initiation of cranking of the engine 2 from its stationary state may be set to a specific timing that is a predefined amount of time after the initiation of cranking of the engine 2 and during increasing of the revolution speed with coasting of the engine 2 after the termination of cranking of the engine 2. The first ignition timing Tc is set depending on an environmental condition, an engine state, a battery state of the starter 3 and others. In some other embodiments, the first ignition timing Tc may be during cranking of the engine by the starter.

The engine-speed predictor 402 is configured to predict a revolution speed of the engine Nc at the ignition timing Tc based on the revolution-speed increase rate during cranking of the engine 2.

For example, the engine-speed predictor 402 is configured to acquire the revolution-speed increase rate during cranking of the engine 2 beforehand as a predefined function, and calculate the revolution speed of the engine Nc at the ignition timing Tc from the revolution-speed increase rate during cranking of the engine 2.

In the present embodiment, for example, the ignition timing Tc is set near TDC of the second cylinder (TDC#2). Since, as described above, the revolution speed increases linearly as the pistons of the first, third, and fourth cylinders move through their respective TDCs in this order, the revolution speed of the engine near TDC of the second cylinder can be readily and accurately calculated from the revolution-speed increase rate. That is, the engine-speed predictor 402 is configured to acquire beforehand the approximate line X defined as above that approximately represents a relationship between the elapsed time from the initiation of cranking of the engine 2 and the revolution speed of the engine as the predefined function, and based on the approximate line X, calculate the revolution speed of the engine Nc at the ignition timing Tc.

It should be noted that the revolution-speed increase rate (the slope of the approximate line X) may vary slightly with variations in applied voltage to the motor 7 depending on the battery state and others. Therefore, the revolution-speed increase rate may be corrected based on the battery state.

Figure 3:
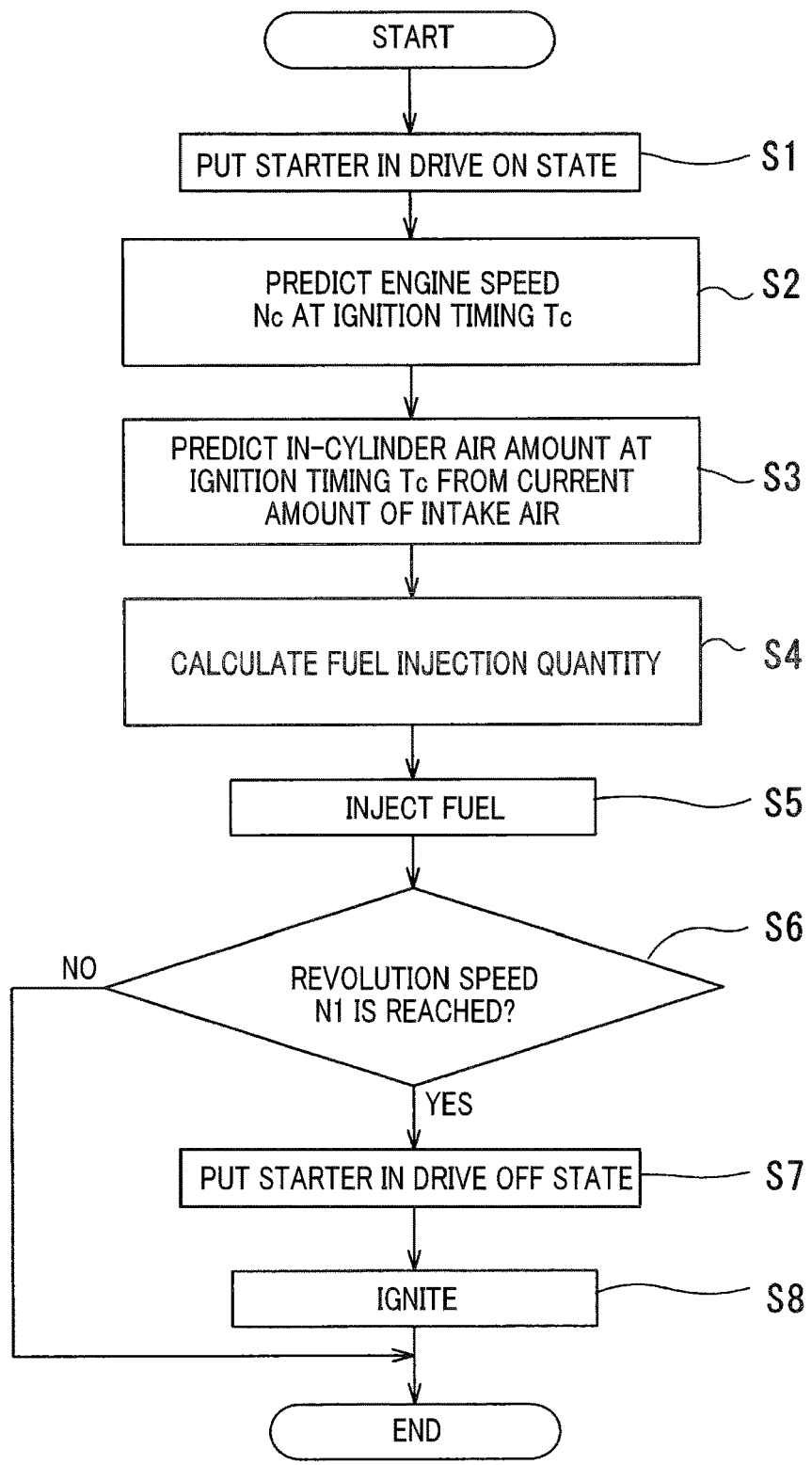
FIG. 3 is a flowchart of an engine starting process.

The engine starting process will now be explained with reference to the flowchart of FIG. 3.

First, in step S1, when the start switch is turned on or the brake is operated off to exit the idle stop, the start command becomes ON and then the starter 3 is put in the drive ON state. That is, the cranking of the engine 2 by the starter 3 is initiated.

Subsequently, in step S2, the revolution speed of the engine Nc at the ignition timing Tc is predicted from the revolution-speed increase rate in the above described manner.

In step S3, an in-cylinder air amount at the ignition timing Tc is predicted from the current amount of intake air.

In step S4, an appropriate fuel injection quantity is calculated based on the predicted revolution speed of the engine Nc and the predicted in-cylinder air amount.

In step S5, the calculated quantity of fuel is injected.

In step S6, it is determined whether or not the revolution speed N1 is reached. If it is determined that the revolution speed N1 is reached, then the cranking of the engine 2 is terminated in step S7.

In step S8, the fuel in the combustion chamber is fired (that is, ignited) by the igniter.

Advantages

In the present embodiment, the starter 3 cranks the engine 2 at a specific revolution-speed increase rate until the predetermined revolution speed N1 equal to or greater than 450 rpm is reached. The engine starting apparatus 1 of the present embodiment includes the ignition-timing setter 401 configured to set the ignition timing Tc at which the fuel in the combustion chamber of the engine 2 is ignited while the revolution speed is increased during cranking of the engine 2 by the starter 3 or during coasting of the engine 2 after termination of cranking of the engine 2 by the starter 3. The engine starting apparatus 1 of the present embodiment further includes the engine-speed predictor 402 configured to predict the revolution speed of the engine Nc at the ignition timing Tc based on the revolution-speed increase rate during cranking of the engine 2.

This allows the engine 2 to be cranked until the revolution speed of the engine reaches a high engine-speed range, the lower limit of which range is equal to or greater than 450 rpm near the idle speed. Thus, in most cases, the ignition does not need to be repeated to start the engine. This is because the engine 2 continues to be cranked until the idle speed is reached or until about shortly before the idle speed is reached. In contrast, with the conventional technique, the idle speed is reached by combustion through receptive ignitions.

The fuel in the combustion chamber is ignited while the revolution speed is increased during cranking of the engine 2 by the starter 3 or during coasting of the engine 2 after termination of cranking of the engine 2 by the starter 3, which allows the revolution speed Nc at the ignition timing Tc to be accurately predicted from the revolution-speed increase rate during cranking of the engine 2. Thus, the engine starting apparatus 1 of the present embodiment is capable of injecting an appropriate quantity of fuel to increase the revolution speed of the engine to the idle speed.

In addition, the specific revolution-speed increase rate is set such that, during cranking of the engine 2, the rotational force of the starter 3 can continue to be transferred from the pinion 8 to the ring gear 11 even when the revolution speed of the engine is increased abruptly with pumping of the engine 2 during cranking of the engine 2.

With this configuration, the torque loss can be avoided that is prone to occur in an early stage of cranking of the engine 2, where the torque loss is a phenomenon such that the revolution speed of the engine slightly exceeds the revolution speed of the pinion 8. Therefore, the revolution speed of the engine during cranking of the engine 2 can be accurately predicted, and an engagement sound caused by jumping teeth between the ring gear 8 and the pinion 11 during cranking of the engine 2 can be reduced.

In the present embodiment, during cranking of the engine 2, the revolution speed increases linearly as the pistons of the first, third, and fourth cylinders sequentially move through their respective TDCs, that is, TDC#1, TDC#3, TDC#4, in this order.

This allows the revolution speed at the ignition that occurs near the next TDC, that is, TDC#2, to be readily and accurately predicted from the revolution speeds at TDC#1, TDC#3, and TDC#4.

In the present embodiment, the motor 7 is a direct-current (DC) motor. This allows the revolution speed to be readily and linearly increased, which allows the revolution speed to be readily and accurately predicted.

MODIFICATIONS

In the embodiment described above, the relationship between the elapsed time from the initiation of cranking of the engine 2 and the revolution speed of the engine is a linear relationship such that the revolution speed of the engine 2 is increased linearly with increasing elapsed time from the initiation of cranking of the engine 2, which relationship can be represented by the approximate line X. Alternatively, the relationship between the elapsed time from the initiation of cranking of the engine 2 and the revolution speed of the engine may be a non-linear relationship that can be represented by a fitted curve.

In the embodiment described above, the ECU 4 (specifically the engine-speed predictor 402) is configured to acquire the engine-speed increase rate beforehand as the predefined function. Alternatively, the ECU 4 (specifically the engine-speed predictor 402) may be configured to use the engine speed sensor 13 to detect revolution speeds at TDCs before the fuel injection quantity setting timing Tb (see FIG. 2), calculate the revolution-speed increase rate based on the detected revolution speeds at TDCs, and based on the calculated revolution-speed increase rate, predict the revolution speed Nc at the ignition timing Tc (near the subsequent TDC).

That is, for example, the revolution speed at TDC of the first cylinder and the revolution speed at TDC of the third cylinder may be detected by the engine speed sensor 13. The revolution speed Nc at the ignition timing Tc may be calculated based on the revolution-speed increase rate calculated from the detected revolution speeds at TDCs of the first and third cylinders.

The conventional starter 3 includes the one-way clutch not only for transferring the rotational force of the motor 7 to the pinion 8, but also for isolating the transfer of rotational force from the pinion 8 to the motor 7.

Since, in the above embodiment, the cranking of the engine 2 is terminated prior to the ignition, the motor 7 is unlikely to be turned by the engine 2. Thus, the one-way clutch is not necessary. In some embodiments where the cranking of the engine is terminated after the ignition, the starter 3 may include the one-way clutch.

What is claimed is:
1. An engine starting apparatus comprising:
   a starter comprising:
      a motor configured to generate a rotational force; and
      a pinion configured to transfer the rotational force of the motor to a ring gear,
      the starter being configured to crank an engine at a specific revolution-speed increase rate until a predetermined revolution speed equal to or greater than 450 rpm is reached; and
   a controller comprising:
      an ignition-timing setter configured to set an ignition timing at which fuel in a combustion chamber of the engine is ignited while the revolution speed of the engine is increasing at the specific revolution-speed increase rate during coasting of the engine after termination of cranking of the engine by the starter; and an engine-speed predictor configured to predict the revolution speed of the engine at the ignition timing set by the ignition-timing setter based on the specific revolution-speed increase rate, wherein the controller is configured to calculate a fuel injection quantity at the ignition timing based on the specific revolution-speed increase rate during cranking of the engine by the starter and perform fuel ignition control to ignite injected fuel in the combustion chamber of the engine at the ignition timing set by the ignition-timing setter after termination of cranking of the engine by the starter.

2. The apparatus of claim 1, wherein the specific revolution-speed increase rate is set such that, during coasting of the engine after cranking of the engine is terminated before an idle speed of the engine is reached, the revolution speed of the engine can continue to increase from the predetermined revolution speed for a predefined amount of time.

3. The apparatus of claim 1, wherein the specific revolution-speed increase rate is set such that, during cranking of the engine, the rotational force of the starter can continue to be transferred from the pinion to the ring gear even when the revolution speed of the engine is increased abruptly with pumping of the engine during cranking of the engine.

4. The apparatus of claim 1, wherein
the engine is a multiple cylinder engine including multiple cylinders,
pistons of at least two of the multiple cylinders sequentially move through top dead centers (TDCs) of the respective cylinders during cranking of the engine,
the revolution speed of the engine increases as the pistons of the at least two cylinders sequentially move through their respective TDCs according to a specific relationship between the elapsed time from the initiation of cranking of the engine and the revolution speed of the engine, and
the ignition-timing setter is configured to predict the revolution speed of the engine at the ignition timing based on the specific relationship between the elapsed time from the initiation of cranking of the engine and the revolution speed of the engine.

5. The apparatus of claim 4, wherein the specific relationship between the elapsed time from the initiation of cranking of the engine and the revolution speed of the engine is a linear relationship such that the revolution speed of the engine is increased linearly with increasing elapsed time from the initiation of cranking of the engine.

6. The apparatus of claim 1, wherein the ignition timing is set to a specific timing during increasing of the revolution speed of the engine with coasting of the engine after the termination of cranking of the engine.

7. The apparatus of claim 1, wherein the motor is a direct-current (DC) motor.

* * * * *